(12) United States Patent
Samari et al.

(10) Patent No.: US 8,769,294 B2
(45) Date of Patent: Jul. 1, 2014

(54) DIGITAL SIGNATURES

(76) Inventors: Ravosh Samari, Calgary (CA); Paymaan Behrouzi, Kelowna (CA)

( * ) Notice: Subject to any disclaimer, the term of this patent is extended or adjusted under 35 U.S.C. 154(b) by 494 days.

(21) Appl. No.: 13/228,200

(22) Filed: Sep. 8, 2011

(65) Prior Publication Data

US 2012/0002806 A1 Jan. 5, 2012

Related U.S. Application Data

(63) Continuation of application No. PCT/CA2010/000355, filed on Mar. 11, 2010.

(60) Provisional application No. 61/159,126, filed on Mar. 11, 2009.

(51) Int. Cl.
*H04L 9/32* (2006.01)
*G06F 17/30* (2006.01)

(52) U.S. Cl.
CPC ............ *H04L 9/3247* (2013.01); *H04L 9/3255* (2013.01); *H04L 9/3257* (2013.01); *H04H 2201/00* (2013.01); *H04H 2201/90* (2013.01); *H04L 9/32* (2013.01); *G06F 17/3074* (2013.01); *G06F 17/30743* (2013.01); *G06F 17/30784* (2013.01)
USPC ............... 713/180; 713/176; 380/200; 725/9; 725/22; 348/161

(58) Field of Classification Search
CPC H04H 2201/90; H04L 9/3247; H04L 9/3255; G06F 17/30743; G06F 17/30784; H04N 7/16; H04N 17/00; H04N 2201/3233

USPC .......... 713/176–177, 180–181; 380/200–242; 725/9, 14, 15, 22; 348/161
See application file for complete search history.

(56) References Cited

U.S. PATENT DOCUMENTS

| 5,436,653 | A | 7/1995 | Ellis et al. | |
|---|---|---|---|---|
| 7,660,700 | B2 * | 2/2010 | Moskowitz et al. | 702/182 |
| 7,783,889 | B2 * | 8/2010 | Srinivasan | 713/179 |
| 8,108,887 | B2 * | 1/2012 | Lee | 725/19 |

(Continued)

FOREIGN PATENT DOCUMENTS

EP 2106050 A2 9/2009

OTHER PUBLICATIONS

Kwan, Wen; Search Report from corresponding PCT Application No. PCT/CA2010/000355; search completed May 25, 2010.

*Primary Examiner* — Jeffrey Pwu
*Assistant Examiner* — Jayesh Jhaveri
(74) *Attorney, Agent, or Firm* — John R. S. Orange; Blake, Cassels & Graydon LLP

(57) ABSTRACT

Digital signature generation apparatus, comprising an envelope generator operable to generate an envelope representation, of only one polarity, of a sampled data segment, and operable for each of successive portions comprising a predetermined plurality of samples to provide a portion sum value as the sum the values of the samples in the portion, thereby to provide said envelope representation; a threshold value generator operable to determine a threshold value for each portion of the envelope representation; an event detector operable to detect, as an event, a transition of a portion sum value across the threshold value for the portion concerned; and a signature generator operable in response a detected event to generate a digital signature characteristic of the sampled data segment.

15 Claims, 11 Drawing Sheets

(56) References Cited

U.S. PATENT DOCUMENTS

| | | |
|---|---|---|
| 2005/0044561 A1* | 2/2005 | McDonald .................... 725/18 |
| 2005/0232411 A1 | 10/2005 | Srinivasan et al. |
| 2007/0064940 A1* | 3/2007 | Moskowitz et al. ......... 380/205 |
| 2007/0199013 A1 | 8/2007 | Samari |
| 2008/0276265 A1* | 11/2008 | Topchy et al. ................. 725/22 |
| 2009/0157391 A1* | 6/2009 | Bilobrov .................... 704/200.1 |
| 2009/0225994 A1* | 9/2009 | Topchy et al. .................. 381/56 |
| 2010/0002904 A1* | 1/2010 | Moskowitz et al. ......... 382/100 |
| 2010/0146287 A1* | 6/2010 | Kreiner et al. ................ 713/178 |
| 2010/0169911 A1* | 7/2010 | Zhang ........................... 725/19 |
| 2010/0171879 A1* | 7/2010 | Zhang .......................... 348/571 |

* cited by examiner

DIGITAL SIGNATURES

CROSS REFERENCE TO RELATED APPLICATIONS

The present application is a continuation of PCT Application No. PCT/CA2010/000355 filed on Mar. 11, 2010 which claims priority from U.S. Provisional Application No. 61/159,126 filed on Mar. 11, 2009 both incorporated herein by reference.

FIELD OF THE INVENTION

The present invention relates to digital signatures, which are also called "digital fingerprints" herein, for example digital audio signatures (digital audio fingerprints), and to apparatus and methods for generating digital signatures (digital fingerprints).

BACKGROUND OF THE INVENTION

Digital signatures (digital fingerprints) can find application in many contexts. Merely one example of a field of application is audience measurement/analysis, as explained below.

Audience measurement/analysis systems, for measuring/analysing TV or radio audiences for instance, commonly make use of so-called meters installed in a panel of households, or on a panel of persons, generally chosen such that the household occupants or persons are demographically representative of the potential audience population as a whole.

The meters are devices which monitor the channels, stations or programs selected for viewing or listening on a TV or radio in the household, or by the person, and typically record information concerning the selected channels, stations or programs for sending, for example by telephone line or other means of communication, to a "central" or "reference" office at which viewing/listening information from households in the panel is collected for analysis.

In the central or reference office all or many channels, stations or programs available for viewing or listening may be monitored and information concerning those channels, stations or programs stored as reference information. Reference information may also be obtained from other sources. For example information concerning programs broadcast on a particular channel or station over a period of time may be obtained directly from the broadcasting company. The information from households/persons may then be analysed to reveal channels, stations or programs selected for viewing in the households or by persons, by comparison or matching of information from the households/persons with the reference information.

Various techniques for household or personal monitoring of channels, stations or programs have been put to use. Similar techniques may in general be used in the central or reference office for monitoring all or many channels, stations or programs available for viewing or listening.

One technique used at least in households is to directly monitor tuning circuits in a TV or radio set, to gain information about the channel (frequency) to which the set is tuned. Another technique is to monitor special identification codes embedded in program signals, for example as broadcast or delivered by a service provider. The codes are embedded "at source" in the program signal by the service provider, for example in an audio signal component, or in an video signal component if video is involved. Such embedded codes typically identify the broadcasting station, and may also containing information identifying the program carried by the station at any given time. A third technique is to derive, from a program selected for viewing or listening, a signature (i.e. fingerprint) characteristic of the program. The signature may be derived from audio or video. Such a signature is not embedded in the program signal at source, but is derived or generated from the program signal at the point of viewing or listening in a household or by a person.

Each of these methods has been perceived to have disadvantages.

Directly monitoring tuning circuits typically requires physical entry into and modification of a TV or radio set concerned, and is therefore undesirably invasive.

Monitoring embedded identification codes, even if physical entry into and modification of a TV or radio set concerned is not always needed, effectively requires such codes to be embedded at source and to be reliably detectable in all, or substantially all, programs. If this is not the case, the information obtained is at best incomplete, likely to the extent that it is of little or no utility.

The use of signatures/fingerprints has been considered to be demanding in terms of cost and the hardware needed, and susceptible in practice to program identification problems due to inconsistencies between signatures/fingerprints generated, on the basis of the same original program content, under the different conditions which may apply at different locations and different times. The different conditions may arise as a result of different program reception conditions or equipment capabilities at different times or locations, for example in a household or at a person on the one hand and at a central or reference office on the other hand.

Not only in this context, there are many applications in which it is desirable to identify a signature/fingerprint, or a sequence of signatures/fingerprints, for example representing a section of audio, from within reference information or a reference database, e.g. of audio, available at a central or reference office. To achieve this it is necessary to generate robust digital fingerprints, e.g. from audio samples, such that if the same original sample, e.g. and audio sample, after having experienced various distortions were to be used to also generate digital fingerprints, an exact or relatively similar fingerprint would be generated, thereby allowing identification, for example by a searching or matching algorithm, of the original audio sample.

Thus, the fingerprints should allow searching from one set of fingerprints (e.g. derived in a household or at a person) within another set (e.g. available at a central or reference office), with the goal of determining if fingerprints from one set match any fingerprints from the other set thereby determining a match.

As mentioned above, one such field in which such identification is desirable is the media audience measurement market. A user or audience member is exposed to audio, for example, produced from television, radio, internet, or similar broadcast.

Another field is in the arena of digital copyright management (DRM—Digital Rights Management). For example, it is desirable to be able to identify if media—e.g. audio media—posted on the internet is in fact copyright material.

Yet another field of the invention is in royalty distribution. Frequently, media broadcasts utilize copyright material. The artist or publisher of this material allows their art to be broadcast usually in return for compensation. Typically, there are royalty distribution organizations that collect funds from the broadcasters or users of the material and distribute the funds to the artists and/or publishers of the material depending on the usage. Digital signatures/fingerprints can be used to identify which copyright material is being broadcast such that the artist or publisher of the material will be duly compensated.

SUMMARY OF THE INVENTION

The present invention is concerned with the provision of robust signatures/fingerprints.

Aspects of the invention are indicated in the accompanying claims and in the paragraphs at the end of this description.

For example, utilizing the present invention in a media audience measurement context, a series of digital fingerprints can be generated, both from original broadcast content, e.g. audio content, and secondarily, from the audio produced by audience receiving equipment. When the latter fingerprints are compared to a database of the former fingerprints (generated using the same technique, and used on all available broadcast material) a match, comprising either an exact match or a close match of the fingerprint, will indicate which media the user was exposed to and therefore also which broadcast. In the case of digital audio fingerprints the apparatus for sampling the audio that the user (audience member) is being exposed to can either be electrically coupled signal pickup, or it can be via a microphone device that will record the audio signals in the environment.

In the field of digital copyright management (DRM—Digital Rights Management) the invention may be used to generate digital fingerprints from all available copyright material, and likewise the same methods and apparatus may be used to generate digital fingerprints from material posted on the internet for example. The fingerprints are compared and if a match is found, the media content posted on the internet will be identified and will allow the owner of the copyright material to police its usage.

An original signal, e.g. audio, and broadcast or received signal may be significantly different due to various distortions including in the case of audio ambient noise, reverb, compression/decompression distortion, playback speed variations, tone adjustment distortion, etc. Method and apparatus in accordance with the invention, used to digitally fingerprint signals, e.g. audio, provide or enhance immunity to distortions for example of the type mentioned above such that accurate matching can be performed. In some prior proposals either the positive match rate is lower than desired, or the false positive match rate is higher than desired. The present invention can provide for satisfactory match rates. Further, the present invention can avoid the disadvantage of some current systems is that a large size of fingerprint is needed and the volume of fingerprints makes data storage, movement, and searching problematic.

In the context of digital audio fingerprinting, embodiments of the present invention can provide for the efficient generation of essentially unique digital fingerprints from segments of audio. These fingerprints can then be used to identify the audio even if the original audio is different from the audio to be matched due to various distortions.

DETAILED DESCRIPTION

In some embodiments of the invention concerned with audio fingerprints, the audio capture device used may be a sound card in a computer, or other audio digitizing equipment. In some embodiments of the invention, the audio capture device may capture sound waves via a transducer, such as a microphone, and digitize via known methods.

Figure 1:
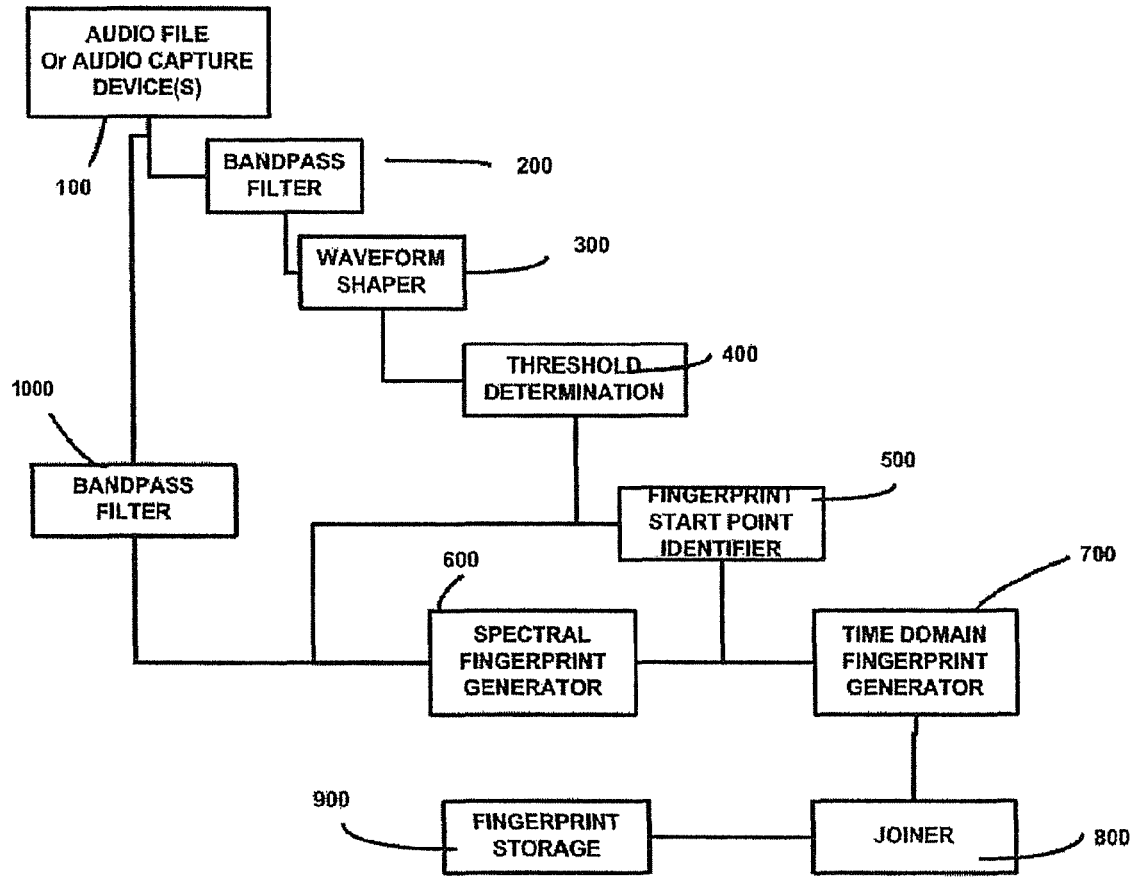
FIG. 1 is a schematic illustration of apparatus embodying the present invention used to capture audio, then generate and store digital fingerprints from captured audio samples.

In the exemplary embodiment of FIG. 1, apparatus as illustrated may for example by used in an audience measurement system to capture broadcast audio that a user is exposed to such as from a TV set, a radio, or a computer viewing media either from the internet, or locally stored and also to capture audio used to generate a reference database. Reference audio, used to generate the reference database, can originate for example from TV broadcasts on a plurality of channels, or a plurality of radio broadcasts, internet media broadcasts, or reference audio such as music on CD's.

Thus, FIG. 1 shows apparatus for use in capturing and generating fingerprints. The audio capture device 100 may, as indicated above, either capture the audio electrically via electrical coupling, or capture via sound waves, via transducer or microphone, or the audio can be presented as an already digitized audio file. The sampling frequency or rate used, which preferably should stay fixed across the system, can be selected as appropriate. In one implementation, a 8000 Hz sampling rate is used, for example with 16 bit resolution per sample.

The digitized audio samples are filtered using a band pass filter arrangement 200. A separate and different band pass filter 1000 is used to filter audio for optional spectral fingerprint generation, which will be explained below.

The band pass filter arrangement 200 may comprise a number, for example four, band pass filters having different pass bands. It may be provided that the pass bands of the filters can be adjusted, to provide for optimal performance. Examples of pass bands for filtering audio samples are: 300 to 800 Hz; 800 to 1300 Hz; 1300 to 1800 Hz; 1800 to 2300 Hz.

In embodiments in which a plurality of band pass filters are provided the resulting output is a plurality of independent waveforms.

Figure 3:
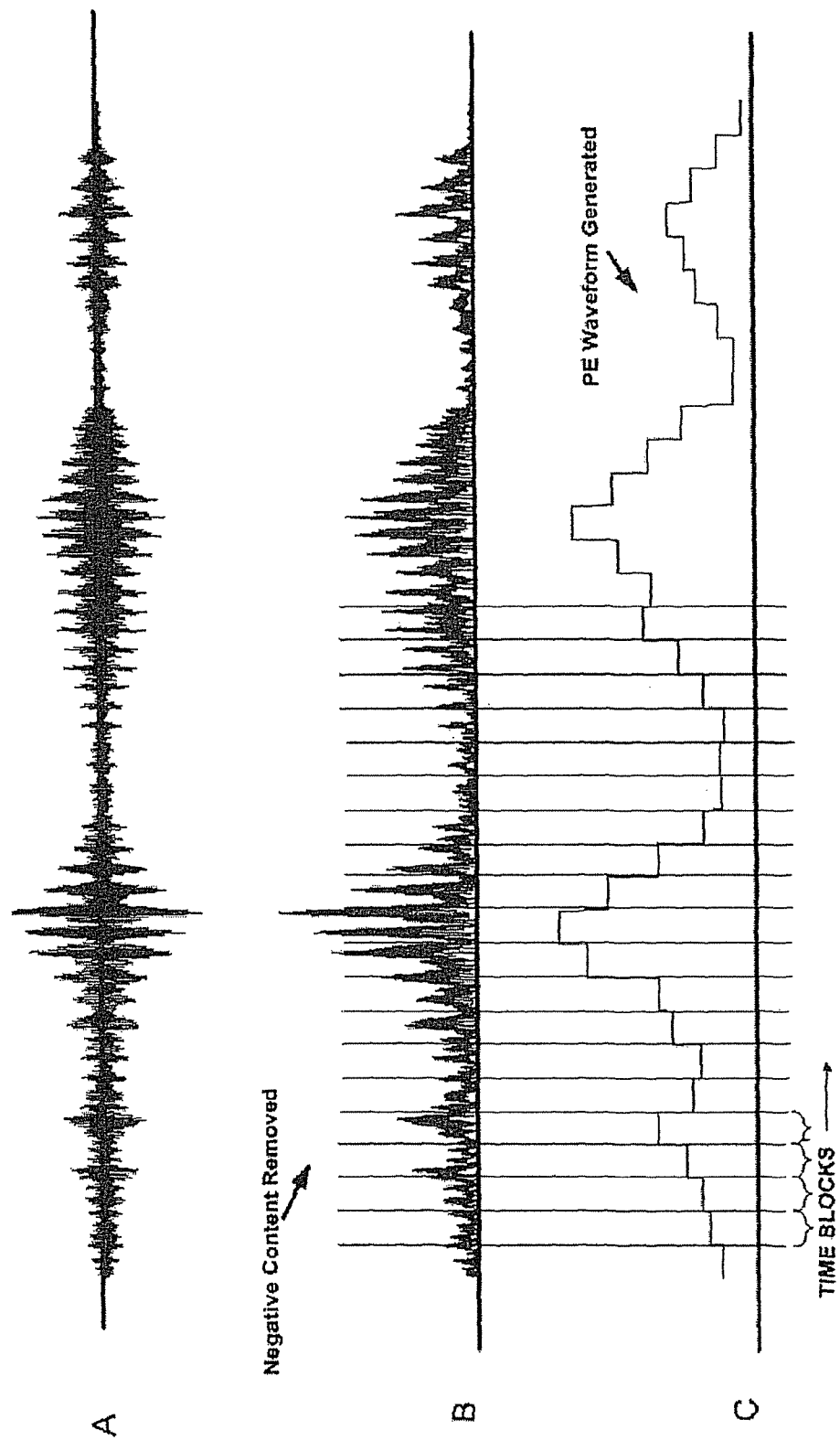
FIG. 3 is a diagram illustrating the operation of a WAVEFORM SHAPER function in accordance with an embodiment of the present invention.

Following bandpass filter arrangement 200, a waveform shaper 300 is employed to shape the waveform from the filter in a two step process which is illustrated in FIG. 3. If the output of the bandpass filter arrangement 200 is a plurality of waveforms, each waveform is subjected to waveform shaping.

FIG. 3 shows three stages, A, B, and C, in the waveform shaping. Stage A shows the original (filtered) digitized audio. Stage B shows the result after the first 'shaper' step has been performed. Stage C shows the final result of the WAVEFORM SHAPER function.

Considering FIG. 3, the first step involves removing negative content from the original digitized audio waveform. This is achieved in two possible ways. The first option is by replacing with 0 all values below zero. The second option, used in a preferred embodiment of the invention, is to convert negative samples to their positive equivalent absolute values. The resulting waveform, showing negative content removed, is shown in stage B of FIG. 3. The second step divides the result of stage B into time blocks consisting of a predetermined number of samples (referred to as blocks of W size in step 2300 of FIG. 2). In a preferred embodiment this predetermined number of samples is 500. Successive values of the samples in each block are then summed up and the result is then used as the value for the entire block. Each block is summed separately. The resultant waveform is shown as stage C in FIG. 3, and referred to below as the Pseudo Envelope Waveform or Pseudo Envelope Array (PE). If the output of the bandpass filter arrangement 200 is a plurality of waveforms, a plurality of PE's are provided.

Figure 2:
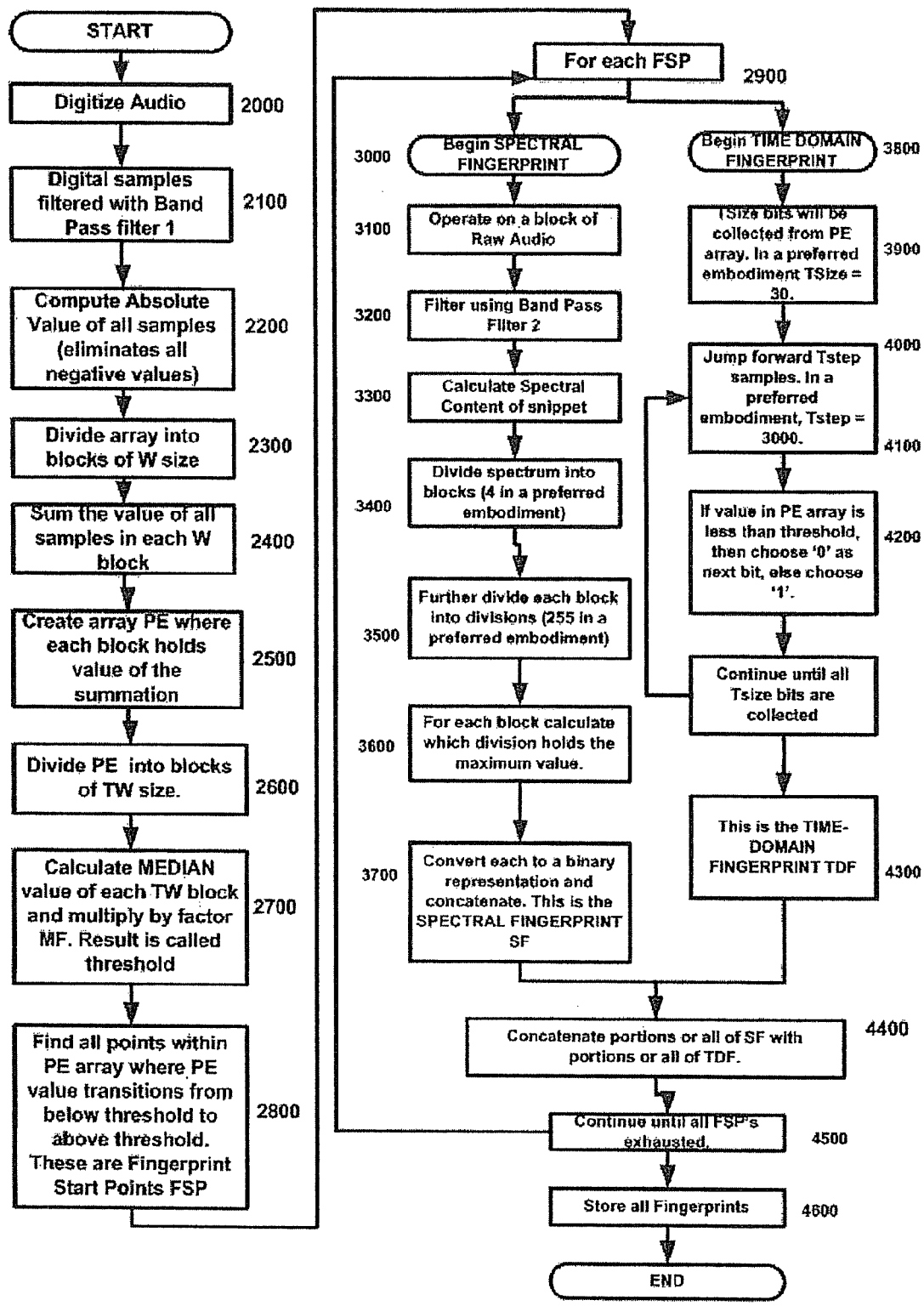
FIG. 2 is a schematic flow diagram of steps used in generating digital fingerprints in accordance with an embodiment of the present invention.

This steps or functions effected so far are shown in FIG. 2 at 2000, 2100, 2200, 2300, 2400, and 2500.

Figure 4:
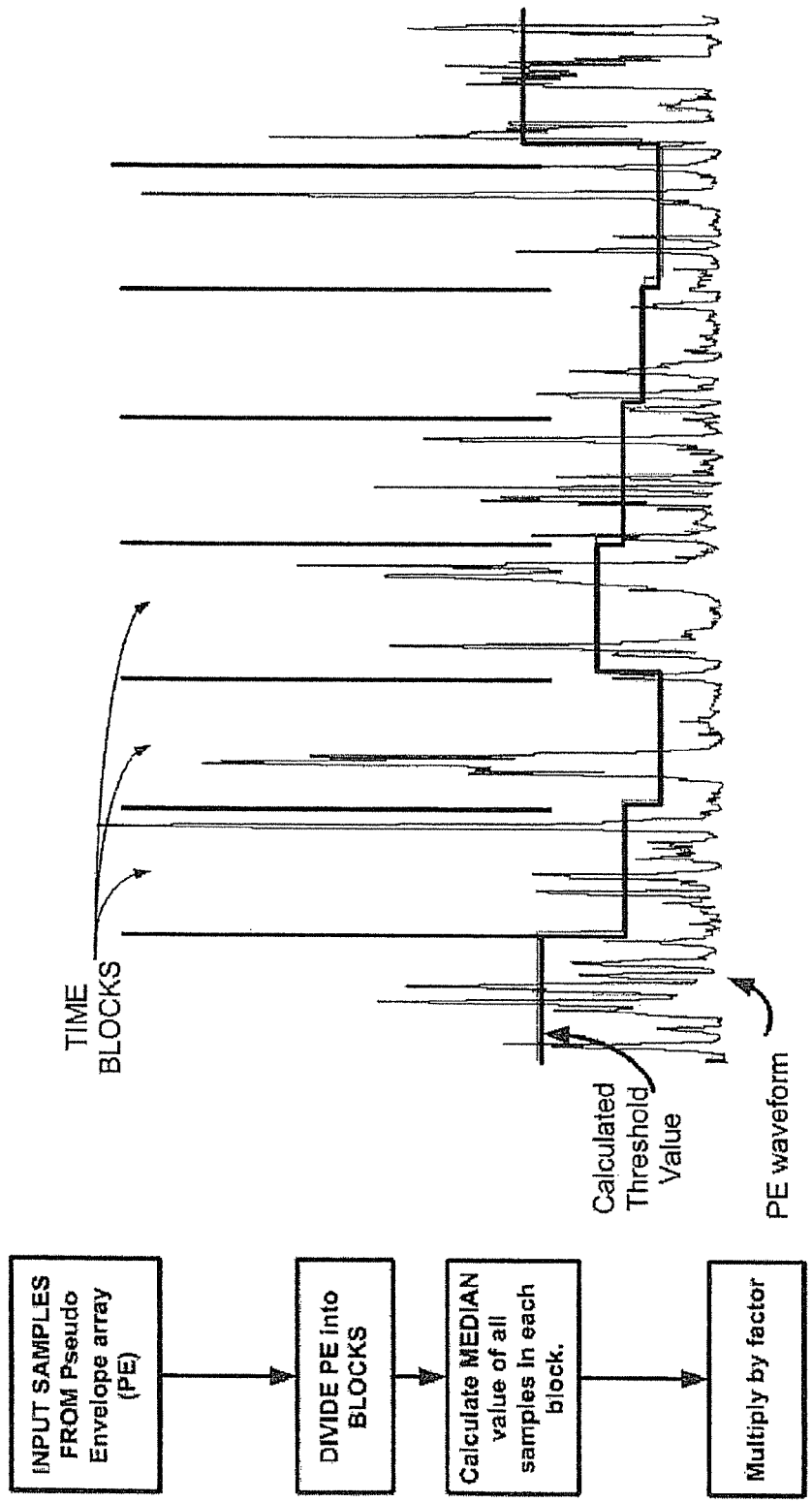
FIG. 4 is a diagram illustrating the operation of a THRESHOLD DETERMINATION function in accordance with an embodiment of the present invention.

A PE waveform or PE array is then passed to a THRESHOLD DETERMINATION block 400 as illustrated in FIG. 1. FIG. 4 illustrates the detailed operation of the THRESHOLD DETERMINATION block for an embodiment of the invention. The operation is performed by dividing the PE into blocks of time. The block size (referred to as TW in step 2600 of FIG. 2) is greater than the block size (W) used in the PE (WAVEFORM SHAPER) section. In a preferred embodiment, the block size is chosen to be a few seconds of audio. In an implementation with a sample rate of 8000 Hz, the block size in a preferred implementation is 60,000 samples. Operating on each block, a par value is calculated. This par value may be for example an average, mean, middle or median value of the samples in the block. An easy way to determine a median value is to sort all values and select the middle value, however any method to determine the median or par value is acceptable. Once the par value is determined, it is multiplied by a factor (MF in step 2700 of FIG. 2). In a preferred implementation this factor is in the range of 1.00 to 1.30. This factor is of significance for the Fingerprint Start Point Identifier function which is described in more detail below. THRESHOLD DETERMINATION is also illustrated in FIG. 2 at 2600 and 2700. The outcome of the THRESHOLD DETERMINATION block is that each sample in a PE waveform or array will also have an associated threshold value (par value multiplied by the factor). It is noted that many samples in a PE can share the same threshold value.

In another embodiment the threshold values may be provided by using a form of moving threshold. In this embodiment the threshold for a sample may be the threshold determined for the temporally preceding sample or block multiplied by a multiplication factor less than unity, for example 0.8, the product of which multiplication is added to the product of the current sample value, or the current block par value, multiplied by unity minus the multiplication factor.

Figure 2A:
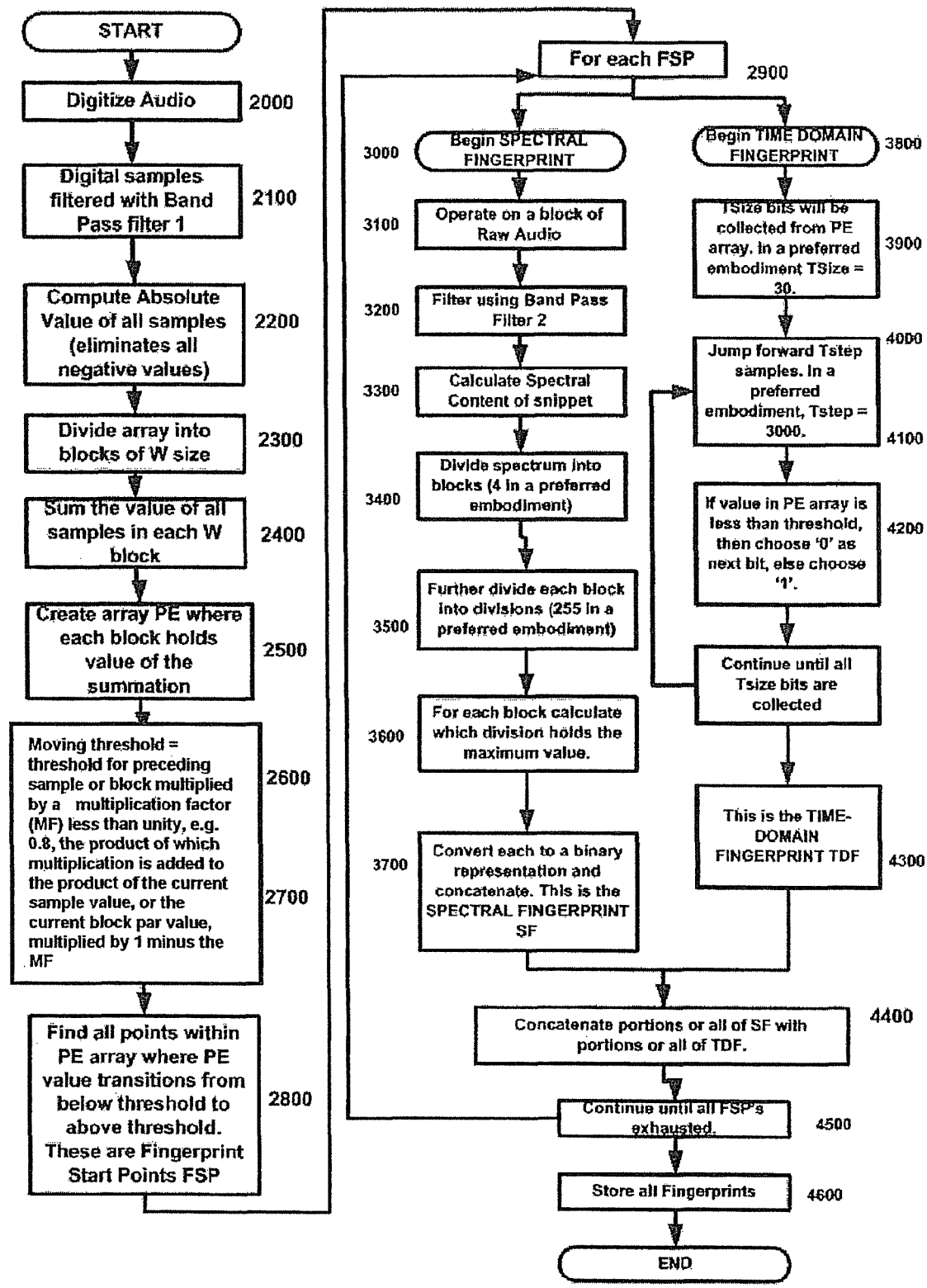
FIG. 2a is a schematic flow diagram of steps used in generating digital fingerprints in accordance with another embodiment of the present invention.
Figure 4A:
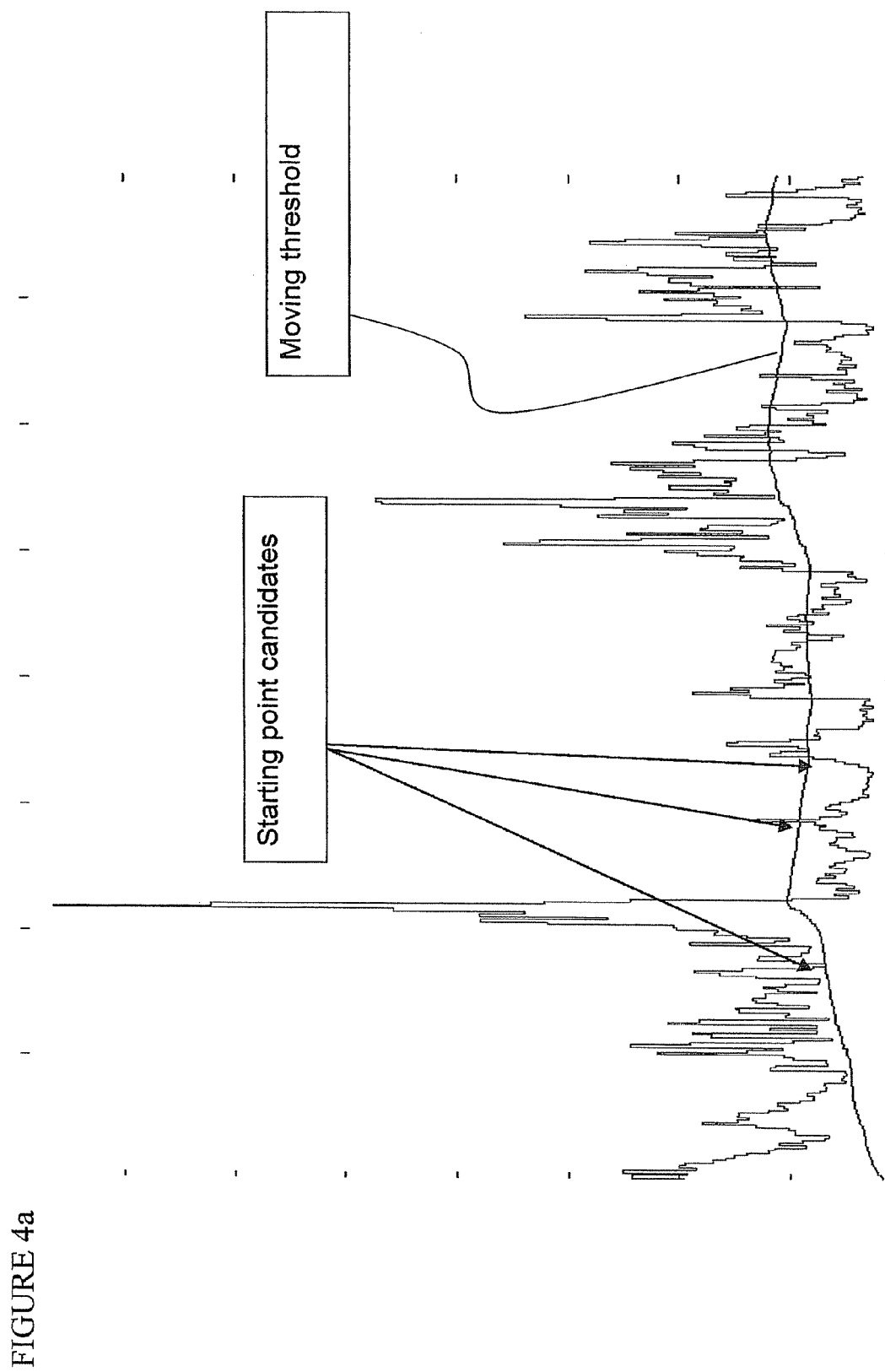
FIG. 4a is a diagram illustrating the operation of a THRESHOLD DETERMINATION function in accordance with another embodiment of the present invention.

This variation of threshold value determination is illustrated in the flowchart of FIG. 2a (see in particular 2600/2700) and in FIG. 4a, where the resulting moving threshold is illustrated.

Where a plurality of PE's are provided, each is subject to threshold determination as described above. For example the same or different block sizes, multiplication factors etc. may be applied to threshold determination for different PE's.

Figure 5:
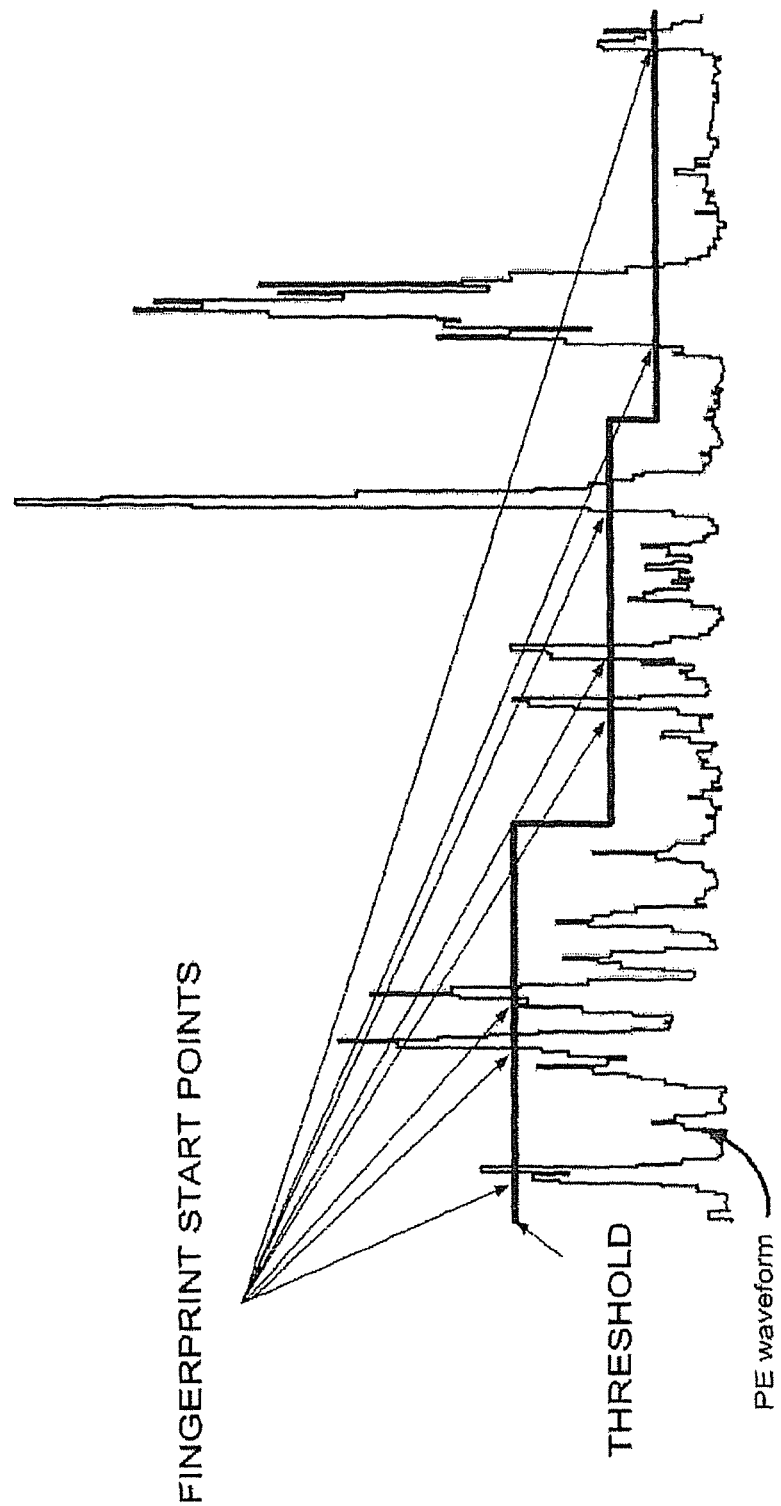
FIG. 5 is a diagram illustrating the operation of a FINGERPRINT START POINT IDENTIFIER function in accordance with an embodiment of the present invention, which selects starting points for fingerprint generation.

FIG. 5 illustrates detailed operation of the FINGERPRINT START POINT IDENTIFIER 500 shown in FIG. 1. The FINGERPRINT START POINT IDENTIFIER identifies starting points where fingerprints (fingerprint generation) will be initiated. The operation is indicated in FIGS. 2 and 2a, 2800. A fingerprint start point (FSP), also called a Sync Event or simply an Event, is determined at each point where the value in the PE array transitions from below the corresponding threshold value to above the threshold—as indicated with arrows in FIG. 5. The FINGERPRINT START POINT IDENTIFIER may also be called an event detector.

As mentioned above, in threshold determination as described in connection with FIG. 4, the operation of establishing a threshold value depends on a multiplication factor. Increasing the value of this multiplication factor can be expected to decrease the number of the fingerprint start points or events, whereas decreasing the multiplication factor can be expected increase the number of fingerprint start points or events. Increasing the number of fingerprint start points or events will increase the robustness and noise immunity of the system.

In relation to threshold determination as described in connection with FIGS. 2 and 4, or threshold determination as described in connection with FIGS. 2a and 4a, it is possible to reduce the number of fingerprint start points or events by selecting only those start points or events which are closest to (closest before or closest after) a major peak in the PE waveform. For example a limited number of only the highest peaks in the waveform may be considered.

Decreasing the number of fingerprint start points will decrease the volume of data that is required to represent, for example, a sample of audio. Depending on the requirements of the particular matching system and end use application, the multiplication factor can be adjusted accordingly.

Where a plurality of PE's are provided, each is subject to determination of fingerprint starting points (Sync Events) as described above.

Fingerprint starting points determined as described above are used in relation to generation of both time-domain fingerprints (see steps 2900 and 3800 to 4300 in FIGS. 2 and 2a) and spectral digital fingerprints (See steps 3000 to 3700 in FIGS. 2 and 2a). Generation of spectral fingerprints may be based on the original signal (unfiltered) digitized signal or the original signal after passage through a band pass filter arrangement 1000, shown in FIG. 1 (Band Pass Filter 2 in 3200 of FIGS. 2 and 2a), rather than the filter arrangement 200 (Band Pass Filter 1 in 2100 of FIGS. 2 and 2a), as explained below.

The use of spectral fingerprints is optional in the present invention. Very, briefly, the optional spectral fingerprint may be generated using frequency analysis. In an embodiment, this spectral fingerprint is generated by using the same fingerprint start points, performing a Fast Fourier Transform, or other technique to determine spectrum power on the original, unfiltered input signal (e.g. audio). In one example implementation 4000 samples of audio were used for each FFT calculation, which is equivalent to half a second of audio. In this implementation only spectrum information below 800 Hz was considered. This was considered to be advantageous because it reduces greatly the processing of the FFT.

Once the FFT has been performed the chosen spectrum is divided into sections. In the example implementation 5 sections are used. In each section, the frequency with the highest power was identified and a 5 bit digital pattern attributed to it. The resulting 5 sequences of 5 bits each are concatenated together to generate a 25 bit fingerprint. The digital pattern is chosen such that neighbouring items will only differ by one bit.

As mentioned above, the use of spectral signatures is optional. Experimentation has shown that acceptable results can be provided using only time domain fingerprints, without using spectral fingerprints. However in some situations use of spectral fingerprints may enable improved overall fingerprint matching rate.

Figure 6:
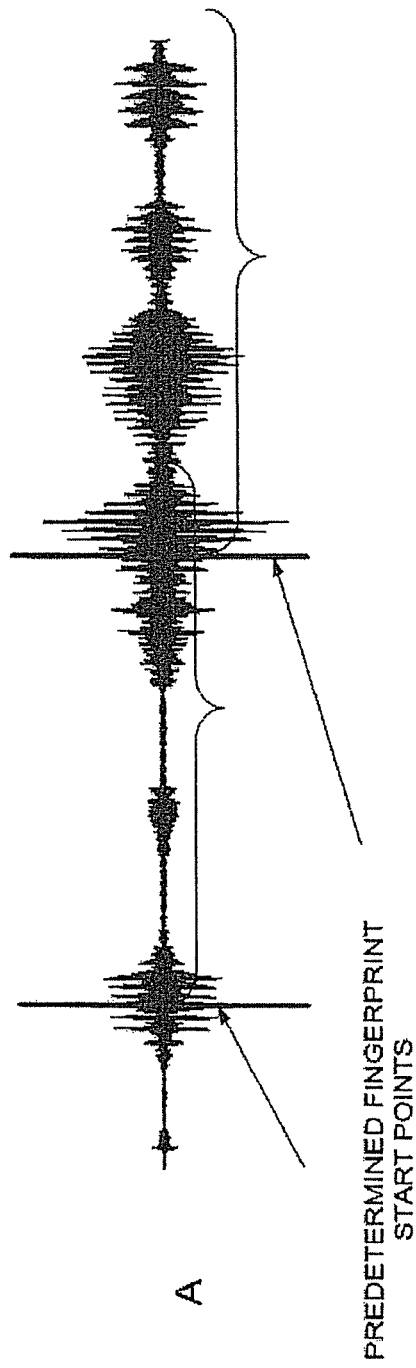
FIG. 6 is a diagram illustrating a SPECTRAL FINGERPRINT GENERATOR operation in accordance with an embodiment of the present invention.
Figure 6:
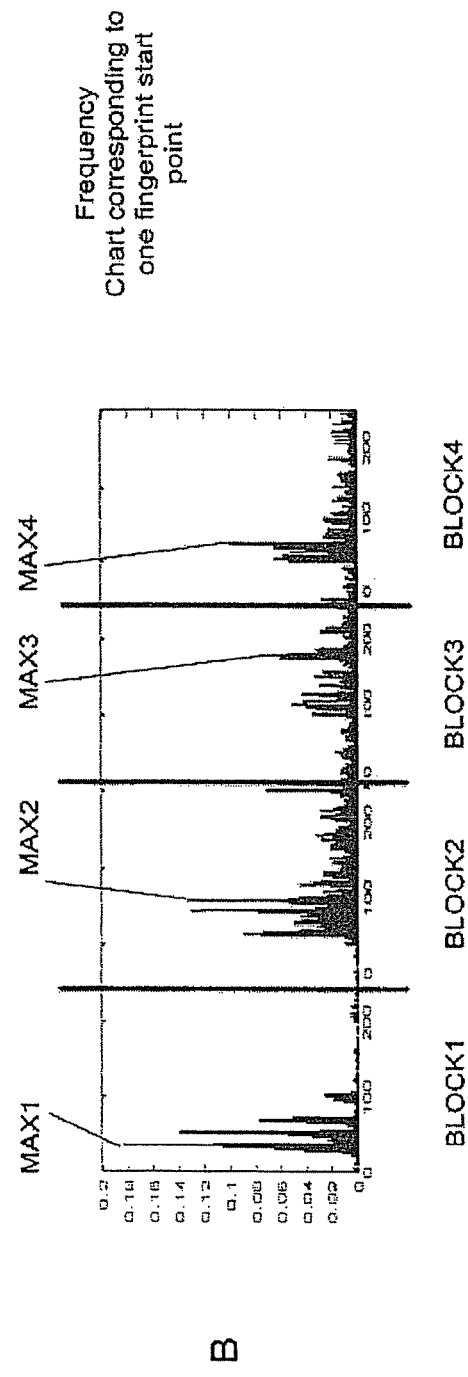

FIG. 6 illustrates detailed operation of the SPECTRAL FINGERPRINT GENERATION 600 shown in FIG. 1, in accordance with another embodiment of the invention. The starting point for each fingerprint is determined in the FINGERPRINT START POINT LOCATION IDENTIFIER block, as explained above. Once the starting points are determined, a Spectral Fingerprint is generated from the raw digitized audio after it has been filtered using the bandpass filter arrangement 1000 as shown in FIG. 1 and indicated in FIGS. 2 and 2a at steps 3000, 3100 and 3200. In a preferred form of this embodiment the audio sample size consists of 4000 samples equating to a half a second of audio. The frequency content of this snippet of audio is calculated for example using Fast Fourier Transform, or Discrete Fourier Transform, or any other method that indicates the energy in the spectrum (step 3300 in FIGS. 2 and 2a). The spectrum is divided into blocks. It is possible to use 1, 2, 3, or 4, or more blocks, but in a preferred form of this embodiment of this invention, 4 blocks are used (step 3400 in FIGS. 2 and 2a). Considering FIG. 6B, each block contains a number of frequency bins or divisions (step 3500 in FIGS. 2 and 2a). In a preferred form of this embodiment, 255 bins are used for each block. The bin or division with the maximum energy from each block is taken (step 3600 in FIGS. 2 and 2a). Therefore each block will produce a number between 1 and 255 corresponding to the bin with the maximum energy. Each number is then converted to its binary equivalent and the binary numbers are concatenated (step 3700 in FIGS. 2 and 2a). The final result is a binary fingerprint consisting of many bits. In a preferred form of this embodiment, a 32 bit spectral fingerprint (SF) is achieved.

Of course, in other embodiments of the invention, spectral fingerprints can be derived for a plurality of frequency bands, for instance 300 Hz to 800 Hz, from 800 Hz to 1300 Hz etc.

Figure 7:
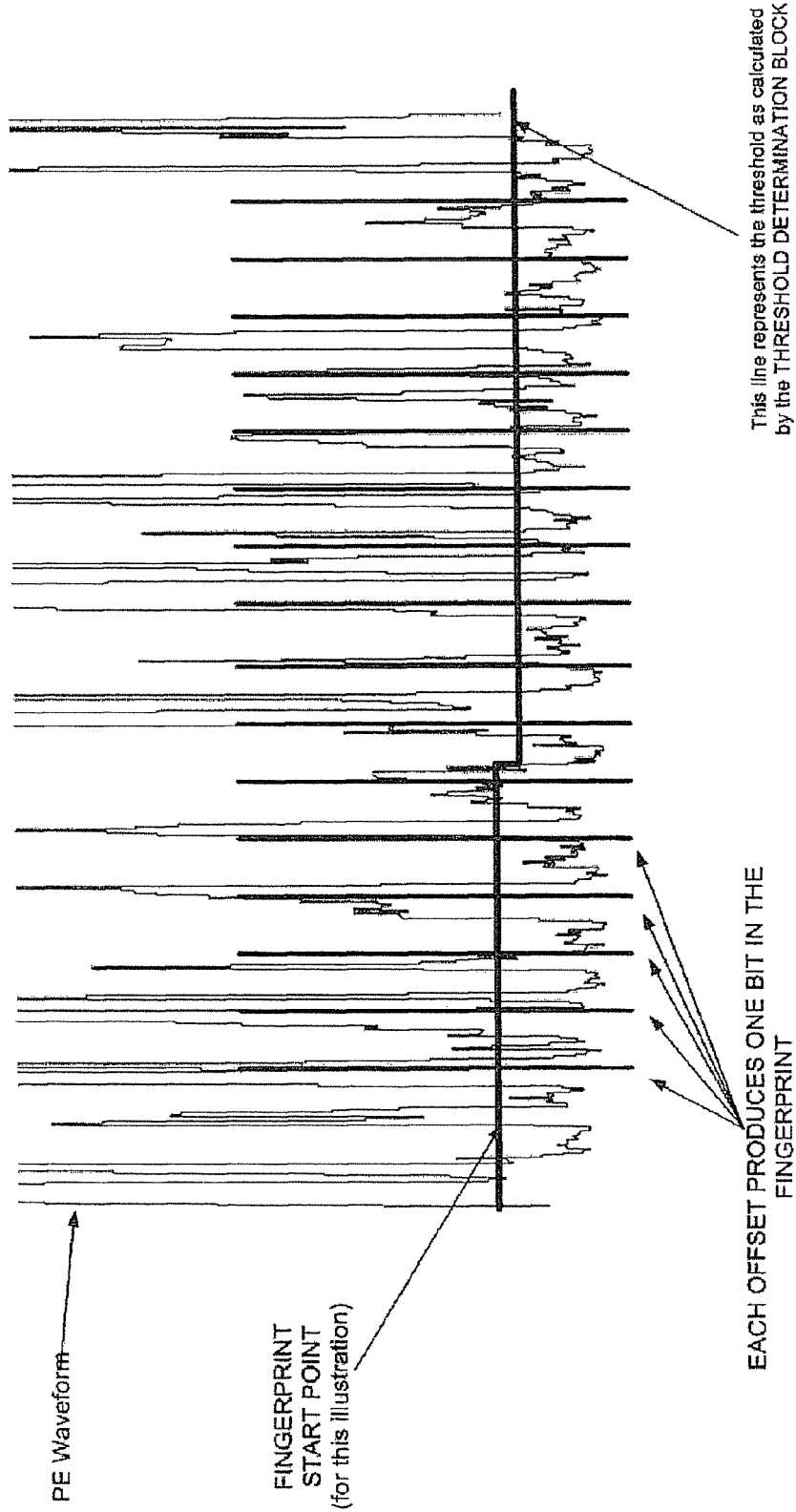
FIG. 7 is a diagram illustrating a TIME-DOMAIN FINGERPRINT GENERATOR operation in accordance with an embodiment of the present invention.

FIG. 7 shows the detailed operation of the TIME-DOMAIN FINGERPRINT GENERATOR 700 shown in FIG. 1. The starting point for each fingerprint is determined in the FINGERPRINT START POINT LOCATION IDENTIFIER block as explained above. A PE array and threshold values are used in conjunction to determine the TIME-DOMAIN FINGERPRINT (TDF) as follows. Immediately following each start point (steps 2900, 3800 in FIGS. 2 and 2a), the value in the PE array, at a location that is a forward offset according to previously chosen offset size (Tstep in step 4000, 4100 of FIGS. 2 and 2a) is considered. The offset can be any value, however, in a preferred embodiment, it (Tstep) is chosen to be 3000 samples. The value in the PE at this offset is compared to the value of the threshold for that location. If the value in the PE is below that of the threshold, then it is considered that the next bit in the fingerprint should be a '0'. Otherwise, it is understood that the next bit is a '1' (step 4200 in FIGS. 2 and 2a). As depicted in FIG. 7, this process continues until all the required bits are collected and a full fingerprint is thus generated (step 4300 in FIGS. 2 and 2a). The number of bits in the fingerprint (TSize in step 3900 of FIGS. 2 and 2a) can be any previously chosen value, however, in preferred implementations, 30 or 40 bits have been chosen.

Figure 7A:
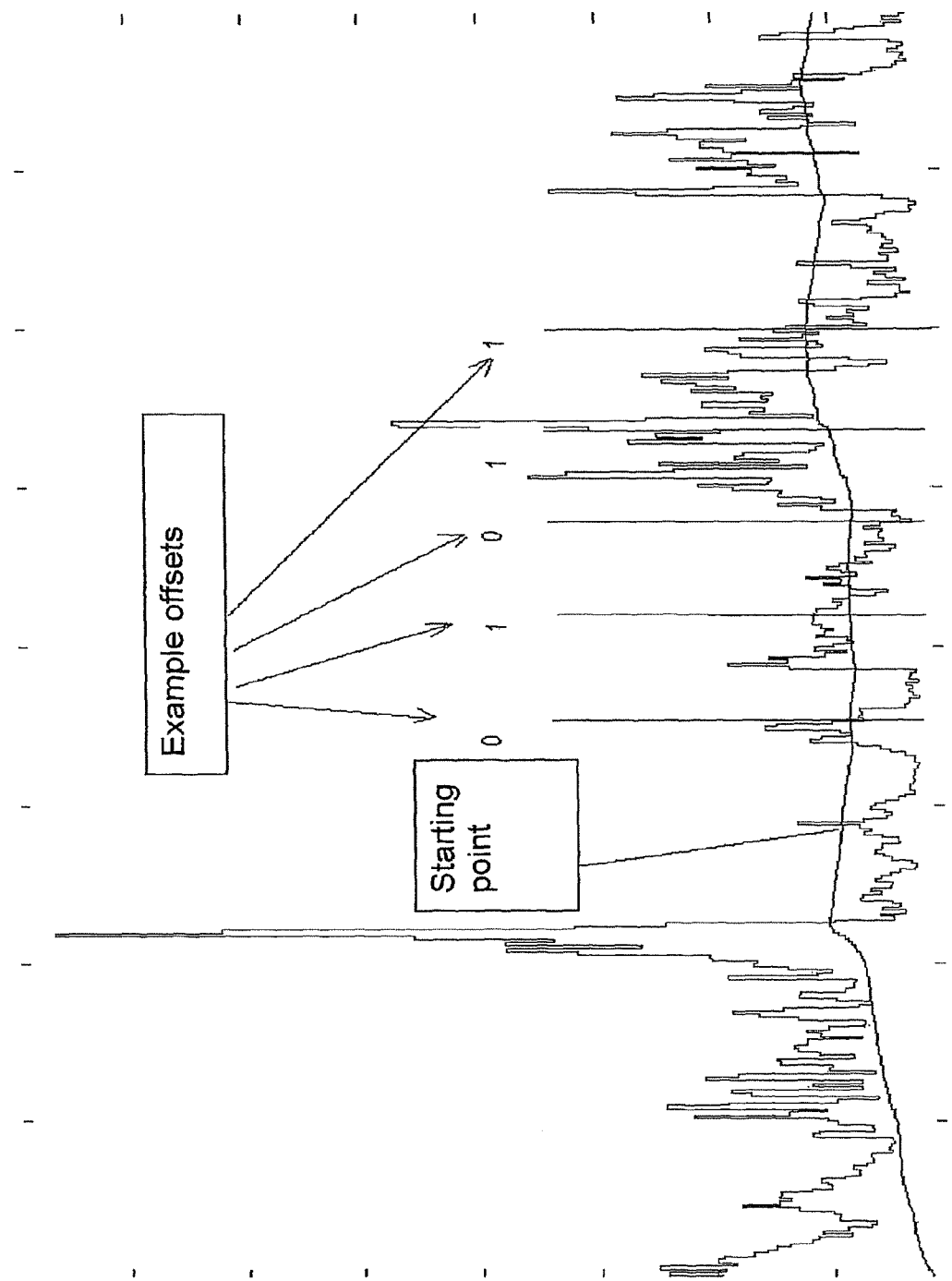
FIG. 7a is a diagram illustrating a TIME-DOMAIN FINGERPRINT GENERATOR operation in accordance with an embodiment of the present invention.

FIG. 7a illustrates the obtaining of time domain fingerprints using a moving threshold as illustrated in FIG. 4a (and FIG. 2a). In the illustrated implementation, using an individual identified starting point identified in the previous stage 40 bits are collected. The 40 bits are collected by jumping out a predetermined number of samples for each bit to be collected and comparing the value of the PE at that location to the value moving threshold at that location. If the value PE is higher then the corresponding bit in the fingerprint is "1", otherwise it is "0".

The generated fingerprints, i.e. time domain fingerprints and, if generated, spectral fingerprints may then be sent for storage in fingerprint storage 900 as shown in FIG. 1 (e.g. step 4600 in FIGS. 2 and 2a).

Optionally, fingerprints may be joined or concatenated as explained below. Such joining or concatenation may not be used in some embodiments of the invention, but in other embodiments may be of advantage depending on the application concerned.

Figure 8:
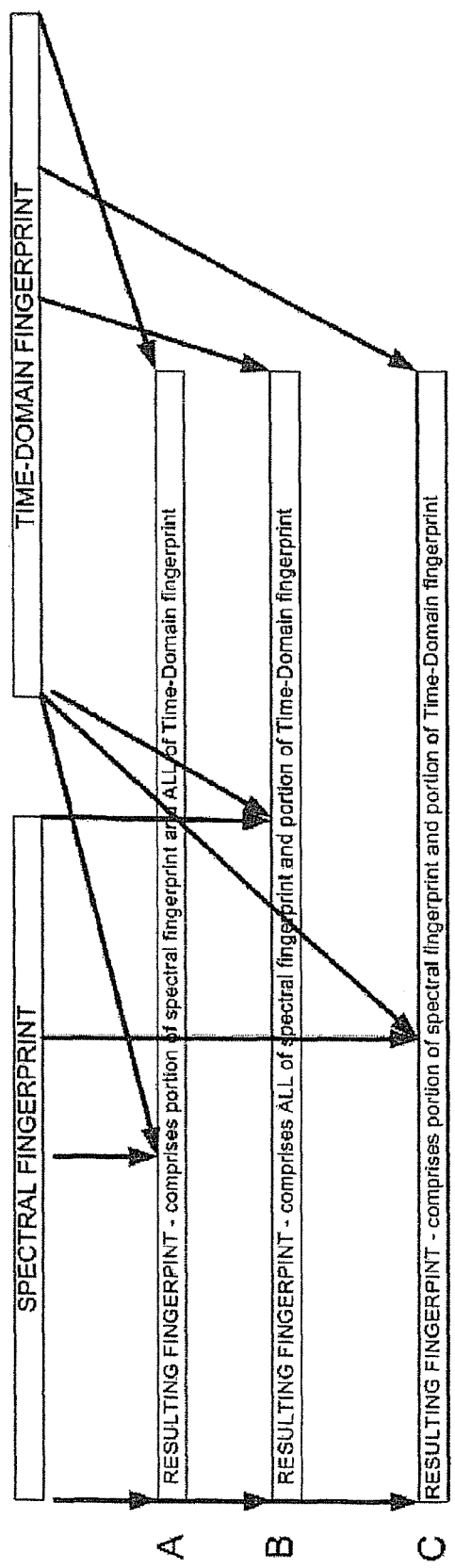
FIG. 8 is a diagram showing a JOINER operation in accordance with an embodiment of the present invention, which uses both the spectral fingerprint and time domain fingerprint to produce several new fingerprints.

FIG. 8 shows the detailed operation of the JOINER 800 illustrated in FIG. 1. A SPECTRAL FINGERPRINT (SF) and a TIME-DOMAIN FINGERPRINT (TDF) may be joined together or concatenated (step 4400 in FIGS. 2 and 2a) in a variety of ways to ultimately produce several fingerprints all of which represent the same original signal (e.g. piece of audio). The fingerprints to be joined or concatenated in each case relate to the same fingerprint starting point (FSP), and concatenation may be carried out in respect of all FSP's (step 4500 in FIGS. 2 and 2a). Considering FIG. 8A, one fingerprint is generated by only taking a portion of an SF and then concatenating that with an entire TDF. Considering FIG. 8B, another fingerprint is generated by taking the entire SF and concatenating that with a portion of the TDF. Considering FIG. 8C, yet another fingerprint is generated by taking a portion of the SF and concatenating that with a portion of the TDF. What is to be understood here is that portions or all of each type of fingerprint can be used in the preparation of final fingerprints. This may provide for advantage in the robustness of the fingerprints such that ultimately the fingerprints will be more immune to noise and distortion. Thus, while one of the fingerprints might work ideally with signals subject to one type of distortion, another type of fingerprint may work ideally with another type of distortion.

It is possible also to join or concatenate all or any of time domain fingerprints and spectral fingerprints, generated from waveforms in different pass bands of the band pass filter arrangements 200, 1000, when multiple waveforms from the different pass bands are processed. For example, time domain fingerprints generated from the four PE waveforms and the spectral fingerprint or fingerprints from the FFT stage—associated with each individual fingerprint starting point—may be concatenated to form one large digital signature. In one implementation, a final concatenated fingerprint consisted of 40 bits for each time domain fingerprint and 25 bits for the (single) spectral fingerprint. This adds up to 185 bits. Testing has shown that signatures as small as 70 bits and as large as 500 bits are feasible. However a large size of fingerprint may be considered a disadvantage in some applications, the volume of fingerprints possibly making data storage, movement, and searching problematic.

Further applications of digital signatures/fingerprints may also be found in more diverse fields that those mentioned above. Many digital signals, regardless of their information content, can be subject to fingerprint or signature generation in accordance with the present invention. For example, digital signals representing any form of scanned image may be subject to fingerprint generation. The image itself might be an image of a face or an image of a true fingerprint or handprint, or an image of a banknote, for example for identification or verification purposes.

The present invention comprehends the aspects set out in the following paragraphs:

(AA). Digital signature generation apparatus, comprising
an envelope generator operable to generate an envelope representation, of only one polarity, of a sampled data segment, the envelope generator comprising
  (i) a polarizer operable (a) to remove samples in the data segment which are of polarity opposite to the one polarity, or (b) to reverse the polarity of samples in the data segment which are of polarity opposite to the one polarity, to provide a polarized data segment and
  (ii) a sample value summer operable, for each of successive portions of the polarized data segment, each portion comprising a predetermined plurality of samples, to provide a portion sum value as the sum the values of the samples in the portion, thereby to provide said envelope representation;
a threshold value generator operable to determine threshold values for each of successive blocks of the envelope representation, each block comprising a plurality of the successive portions, each threshold value being determined based on a par value of the portion sum values of the portions comprised in the block concerned;
an event detector operable to detect, as an event, a transition of a portion sum value across the threshold value for the block to which the portion concerned belongs; and
a signature generator operable in response to the or a detected event to a generate a digital signature characteristic of the sampled data segment.

(AB). Apparatus in accordance with paragraph (AA), wherein the par value is an average, mean, median or middle value of the portion sum values of the portions comprised in the block concerned.

(AC). Digital signature generation apparatus, comprising
an envelope generator operable to generate an envelope representation, of only one polarity, of a sampled data segment, the envelope generator comprising
  (i) a polarizer operable (a) to remove samples in the data segment which are of polarity opposite to the one polarity, or (b) to reverse the polarity of samples in the data segment which are of polarity opposite to the one polarity, to provide a polarized data segment and
  (ii) a sample value summer operable, for each of successive portions of the polarized data segment, each portion comprising a predetermined plurality of samples, to provide a portion sum value as the sum the values of the samples in the portion, thereby to provide said envelope representation;
a threshold value generator operable to determine a threshold value for each portion of the envelope representation, each threshold value being derived from (A) the threshold of the preceding portion, and (B) the current portion sum value and (C) a determined multiplication factor;
an event detector operable to detect, as an event, a transition of a portion sum value across the threshold value for the portion concerned; and
a signature generator operable in response to the or a detected event to a generate a digital signature characteristic of the sampled data segment.

(AD). Apparatus in accordance with paragraph (AC), wherein each threshold value is the sum of (i) the threshold of the preceding portion multiplied by a multiplication factor less than unity, and (ii) the product of the current portion sum value and unity minus said multiplication factor.

(AE). Apparatus in accordance with any of paragraphs (AA), (AB), (AC) and (AD), wherein the signature generator is operable, on the basis of a predetermined signature collection pattern specifying a plurality of sample offsets from the or a detected event, to determine whether the portion sum value at each sample offset is greater or less than the threshold value at the sample offset concerned, and to set the value of a corresponding bit of a signature in dependence thereupon, to provide a binary signature.

(AF). Apparatus in accordance with paragraph (AE), wherein the binary signature is provided by the numerical value or the pattern represented by the values of respective bits of the bit sequence of the binary signature, when those values are taken in a predetermined order as a sequence of binary digits, from most significant to least significant or vice versa.

(AG). Apparatus in accordance with paragraph (AF), wherein the predetermined order is that of increasing offset of the samples from which the bit values are determined.

(AH). Apparatus in accordance with any of paragraphs (AA), (AB), (AC), (AD), (AE), (AF) and (AG), wherein the signature generator is operable, in response to the or a detected event, to determine energy content across a frequency spectrum of a section of the sampled data segment, to divide the frequency spectrum into a plurality of frequency bands which are allocated respective identifying numbers, and to determine the identifying number of the frequency band of maximum energy, to provide a frequency signature comprising this identifying number.

(AI). Apparatus in accordance with paragraph (AH), wherein the signature generator is operable to determine energy content across a plurality of different frequency spectrums of the section of the sampled data segment, to divide each frequency spectrum into a plurality of frequency bands which are allocated respective identifying numbers, and to determine for each frequency spectrum the identifying number of the frequency band of maximum energy, to provide a frequency signature comprising the identifying numbers for each frequency spectrum.

(AJ). Apparatus in accordance with either of paragraphs (AH) and (AI), wherein a band-pass filter is provided and arranged such that the frequency spectrum or spectrums is or are that or those of a band-pass filtered version of the section of the sampled data segment.

(AK). Apparatus in accordance with any of paragraphs (AH), (AI) and (AJ) which is also in accordance with any of paragraphs (AE), (AF) and (AG), wherein the signature generator is operable to provide a signature comprising in combination at least parts of the binary signature and the frequency signature.

(AL). Apparatus in accordance with either of paragraphs (AA) and (AB), or apparatus in accordance with any of paragraphs (AE), (AF), (AG), (AH), (AI), (AJ) and (AK) which is also in accordance with either of paragraphs (AA) and (AB), wherein the threshold value generator further comprises a multiplier operable to multiply the par value by a predetermined multiplication factor, to provide the block threshold value.

(AM). Apparatus in accordance with any of paragraphs (AA), (AB), (AC), (AD), (AE), (AF), (AG), (AH), (AI), (AJ), (AK) and (AL), further comprising a filter operable to band-pass filter the sampled data segment, the envelope detector generating the envelope representation on the basis of the band-pass filtered data segment.

(AN). Apparatus in accordance with paragraph (AM), wherein the filter has a plurality of pass bands and the envelope detector is operable to generate respective envelope representations on the basis of the data segment as filtered in each pass band.

(AO). Apparatus in accordance with any of paragraphs (AA), (AB), (AC), (AD), (AE), (AF), (AG), (AH), (AI), (AJ), (AK), (AL), (AM) and (AN), wherein the event detector is operable to detect, as an event, for each envelope representation generated on the basis of the data segment as filtered in each pass band, a transition of a portion sum value across the threshold value for the portion concerned.

(AP). Apparatus in accordance with paragraph (AO), wherein the signature generator is operable in response to the or a detected event to a generate a digital signature characteristic of the sampled segment as filtered in the pass band for which the event concerned is detected.

(AQ). Apparatus in accordance with any of paragraphs (AA), (AB), (AC), (AD), (AE), (AF), (AG), (AH), (AI), (AJ), (AK), (AL), (AM), (AN), (AO) and (AP), further comprising, a time stamp generator operable to generate a time stamp indicating the time at which the digital signature was generated.

(AR). Apparatus in accordance with any of paragraphs (AA), (AB), (AC), (AD), (AE), (AF), (AG), (AH), (AI), (AJ), (AK), (AL), (AM), (AN), (AO), (AP) and (AQ), wherein the sampled data segment is a sampled audio segment.

(AS). A method of digital signature generation, comprising
generating an envelope representation, of only one polarity, of a sampled data segment, by
(a) removing samples in the data segment which are of polarity opposite to the one polarity, or (b) reversing the polarity of samples in the data segment which are of polarity opposite to the one polarity, to provide a polarized data segment and
for each of successive portions of the polarized data segment, each portion comprising a predetermined plurality of samples, providing a portion sum value as the sum the values of the samples in the portion, thereby to provide said envelope representation;
determining threshold values for each of successive blocks of the envelope representation, each block comprising a plurality of the successive portions, each threshold value being determined based on a par value of the portion sum values of the portions comprised in the block concerned;
detecting, as an event, a transition of a portion sum value across the threshold value for the block to which the portion concerned belongs; and
in response to the or a detected event, generating a digital signature characteristic of the sampled data segment.

(AT). A method in accordance with paragraph (AS), wherein the par value is an average, mean, median or middle value of the portion sum values of the portions comprised in the block concerned.

(AU). A method of digital signature generation, comprising
generating an envelope representation, of only one polarity, of a sampled data segment, by
(a) removing samples in the data segment which are of polarity opposite to the one polarity, or (b) reversing the polarity of samples in the data segment which are of polarity opposite to the one polarity, to provide a polarized data segment and
for each of successive portions of the polarized data segment, each portion comprising a predetermined plurality of samples, providing a portion sum value as the sum the values of the samples in the portion, thereby to provide said envelope representation;
determining a threshold value for each portion of the envelope representation, each threshold value being derived from (A) the threshold of the preceding portion, and (B) the current portion sum value and (C) a determined multiplication factor;
detecting, as an event, a transition of a portion sum value across the threshold value for the portion concerned; and
in response to the or a detected event, generating a digital signature characteristic of the sampled data segment.

(AV). A method in accordance with paragraph (AU), wherein each threshold value is the sum of (i) the threshold of the preceding portion multiplied by a multiplication factor less than unity, and (ii) the product of the current portion sum value and unity minus said multiplication factor.

(AW). A method in accordance with any of paragraphs (AS), (AT), (AU) and (AV), wherein the signature generation comprises, on the basis of a predetermined signature collection pattern specifying a plurality of sample offsets from the or a detected event, determining whether the portion sum value at each sample offset is greater or less than the threshold value at the sample offset concerned, and set the value of a corresponding bit of a signature in dependence thereupon, to provide a binary signature.

(AX). A method in accordance with paragraph (AW), wherein the binary signature is provided by the numerical value or the pattern represented by the values of respective bits of the bit sequence of the binary signature, when those values are taken in a predetermined order as a sequence of binary digits, from most significant to least significant or vice versa.

(AY). A method in accordance with paragraph (AX), wherein the predetermined order is that of increasing offset of the samples from which the bit values are determined.

(AZ). A method in accordance with any of paragraphs (AS), (AT), (AU), (AV), (AW), (AX) and (AY), wherein the signature generation comprises, in response to the or a detected event, determining energy content across a frequency spectrum of a section of the sampled data segment, dividing the frequency spectrum into a plurality of frequency bands which are allocated respective identifying numbers, and determining the identifying number of the frequency band of maximum energy, to provide a frequency signature comprising this identifying number.

(BA). A method in accordance with paragraph (AZ), wherein the signature generation comprises determining energy content across a plurality of different frequency spectrums of the section of the sampled data segment, dividing each frequency spectrum into a plurality of frequency bands which are allocated respective identifying numbers, and determining for each frequency spectrum the identifying number of the frequency band of maximum energy, to provide a frequency signature comprising the identifying numbers for each frequency spectrum.

(BB). A method in accordance with either of paragraphs (AZ) and (BA), comprising band-pass filtering such that the frequency spectrum or spectrums is or are that or those of a band-pass filtered version of the section of the sampled data segment.

(BC). A method in accordance with any of paragraphs (AZ), (BA) and (BB), which is also in accordance with any of paragraphs (AW), (AX) and (AY), wherein the signature generator is operable to provide a signature comprising in combination at least parts of the binary signature and the frequency signature.

(BD). A method in accordance with paragraph (AS) or (AT), or which accordance with any of paragraphs (AW), (AX), (AY), (AZ), (BA), (BB) and (BC) and also in accordance with any of paragraphs (AS) and (AT), further comprising multiplying the par value by a predetermined multiplication factor, to provide the block threshold value.

(BE). A method in accordance with any of paragraphs (AS), (AT), (AU), (AV), (AW), (AX), (AY), (AZ), (BA), (BB), (BC) and (BD), further comprising band-pass filtering the sampled data segment and generating the envelope representation on the basis of the band-pass filtered data segment.

(BF). A method in accordance with paragraph (BE), comprising band-pass filtering in a plurality of pass bands and generating respective envelope representations on the basis of the data segment as filtered in each pass band.

(BG). A method in accordance with any of paragraphs (AS), (AT), (AU), (AV), (AW), (AX), (AY), (AZ), (BA), (BB), (BC), (BD), (BE) and (BF), comprising detecting, as an event, for each envelope representation generated on the basis of the data segment as filtered in each pass band, a transition of a portion sum value across the threshold value for the portion concerned.

(BH). A method in accordance with paragraph (BG), comprising, in response to the or a detected event, generating a digital signature characteristic of the sampled segment as filtered in the pass band for which the event concerned is detected.

(BI). A method in accordance with any of paragraphs (AS), (AT), (AU), (AV), (AW), (AX), (AY), (AZ), (BA), (BB), (BC), (BD), (BE), (BF), (BG) and (BH), further comprising generating a time stamp indicating the time at which the digital signature was generated.

(BJ). A method in accordance with any of paragraphs (AS), (AT), (AU), (AV), (AW), (AX), (AY), (AZ), (BA), (BB), (BC), (BD), (BE), (BF), (BG), (BH) and (BI), wherein the sampled data segment is a sampled audio segment.

(BK). Computer equipment programmed to carry out the method in accordance with any of paragraphs (AS), (AT), (AU), (AV), (AW), (AX), (AY), (AZ), (BA), (BB), (BC), (BD), (BE), (BF), (BG), (BH), (BI) and (BJ).

(BL). A computer program operable in computer equipment to cause the equipment to carry out the method in accordance with any of paragraphs (AS), (AT), (AU), (AV), (AW), (AX), (AY), (AZ), (BA), (BB), (BC), (BD), (BE), (BF), (BG), (BH), (BI) and (BJ).

(BM). A storage medium storing a computer program according to claim (BL).

(BN). A system comprising a database of digital signatures generated by apparatus or method, as the case may be, in accordance with any of paragraphs (AA) to (BJ), and means for comparing a further digital signature, also generated by apparatus or method, as the case may be, in accordance with any of paragraphs (AA) to (BJ), with digital signatures of the database, to seek a match between said further digital signature and a digital signature of the database.

(BO). A system in accordance with paragraph (BN), wherein said further digital signature is compared bit-wise with digital signatures of the database.

(BP). A system in accordance with paragraph (BO), wherein said further digital signature is considered to match a compared digital signature of the database if the signatures concerned are bit-wise identical or differ only at selected bit positions of the signatures.

(BQ). A system in accordance with paragraph (BN), wherein permutations of said further digital signature are generated, differing at up to a predetermined number of bit positions from said further digital signature, and a match is considered to be found if said further digital signature or any of the generated permutations are bitwise identical with a digital signature of the database.

(BR). A system in accordance with paragraph (BQ), wherein the permutations differ at up to a predetermined number of predetermined bit positions from said further digital signature.

(BS). A system in accordance with paragraph (BN), wherein said further digital signature is compared with digital signatures of the database using the numerical values of the compared signatures as represented by the values of respective bits the signatures, when those values are taken in a predetermined order as a sequence of binary digits, from most significant to least significant or vice versa.

(BT). A system in accordance with paragraph (BS), wherein said further digital signature is considered to match a digital signature of the database if the have the same numerical value or differ in numerical value by less than a predetermined amount.

(BU). An audience measurement system including, in one or more households, household entertainment equipment such as a TV receiver, radio receiver, or other program source, capable of producing audio signals, and apparatus in accordance with any of paragraphs (AA) to (AR), the apparatus generating digital audio signatures of sampled audio segments derived from the audio signals.

(BV). An audience measurement system in accordance with paragraph (BU), further including, in a reference office, reference equipment such as a reference receiver for receiving a plurality of TV and/or radio programs, or other reference program sources comprising audio, and apparatus in accordance with any of paragraphs (AA) to (AR), the apparatus generating reference digital audio signatures of sampled audio segments derived from the audio of the received programs or other program sources.

(BW). An audience measurement system in accordance with paragraph (BV), further including, in the reference office, a database of the reference digital audio signatures and means for comparing a further digital audio signature, supplied to the reference office from a household, with the database to identify the further digital audio signal.

The invention claimed is:

1. Digital signature generation apparatus, comprising
a processing device configured to digitize a media signal to obtain a sampled data segment;
an envelope generator coupled to the processing device and configured to generate an envelope representation, of only one polarity, of the sampled data segment, the envelope generator comprising
(i) a provider coupled to the processing device and configured (a) to remove samples in the sampled data segment which are of polarity opposite to the one polarity, or (b) to reverse the polarity of samples in the sampled data segment which are of polarity opposite to the one polarity, to provide a polarized data segment and
(ii) a sample value summer coupled to the processing device and configured, for each of successive portions of the polarized data segment, each portion comprising a predetermined plurality of samples, to provide a portion sum value as the sum of the values of the samples in the portion, thereby to provide said envelope representation;

a threshold value generator coupled to the processing device and configured to determine threshold values for each of successive blocks of the envelope representation, each block comprising a plurality of the successive portions, each threshold value being determined based on a par value of the portion sum values of the portions comprised in the block concerned, or operable to determine a threshold value for each portion of the envelope representation, each threshold value being derived from (A) the threshold of the preceding portion, and (B) the current portion sum value and (C) a multiplication factor;

an event detector coupled to the processing device and configured to detect, as an event, a transition of one of the portion sum values across the threshold value for the block to which the portion concerned belongs, or a transition of one of the portion sum values across the threshold value for the portion concerned; and a signature generator coupled to the processing device and configured in response to the detected event to generate a digital signature characteristic of the sampled data segment.

2. The apparatus as claimed in claim 1, wherein the signature generator is coupled to the processing device and configured, based on a predetermined signature collection pattern specifying a plurality of sample offsets from the detected event, to determine whether the portion sum value at each sample offset is greater or less than the threshold value at the sample offset concerned, and to set the value of a corresponding bit of a signature in dependence thereupon, to provide a binary signature.

3. The apparatus as claimed in claim 1, wherein the signature generator is coupled to the processing device and configured to determine energy content across a frequency spectrum of a section of the sampled data segment, to divide the frequency spectrum into a plurality of frequency bands which are allocated respective identifying numbers, and to determine the identifying number of the frequency band of maximum energy, to provide a frequency signature comprising this identifying number.

4. The apparatus as claimed in claim 1, wherein a filter having a plurality of pass bands is provided and the envelope generator is configured to generate respective envelope representations based on the sampled data segment as filtered in each pass band.

5. The apparatus as claimed in claim 4, wherein the event detector is configured to detect, as an event, for each envelope representation generated based on the sampled data segment as filtered in each pass band, a transition of one of the portion sum values across the threshold value for the portion concerned.

6. The apparatus as claimed in claim 1, wherein the sampled data segment is a sampled audio segment.

7. A method of digital signature generation performed by a digital signature generation apparatus having a processing device, the method comprising digitizing a media signal by the processing device to obtain a sampled data segment;

generating an envelope representation, of only one polarity, of the sampled data segment, by (a) removing samples in the sampled data segment which are of polarity opposite to the one polarity, or (b) reversing the polarity of samples in the data segment which are of polarity opposite to the one polarity, to provide a polarized data segment and for each of successive portions of the polarized data segment, each portion comprising a predetermined plurality of samples, providing a portion sum value as the sum of the values of the samples in the portion, thereby to provide said envelope representation;

determining threshold values for each of successive blocks of the envelope representation, each block comprising a plurality of the successive portions, each threshold value being determined based on a par value of the portion sum values of the portions comprised in the block concerned, or determining a threshold value for each portion of the envelope representation, each threshold value being derived from (A) the threshold of the preceding portion, and (B) the current portion sum value and (C) a determined multiplication factor;

detecting, as an event, a transition of one of the portion sum values across the threshold value for the block to which the portion concerned belongs, or a transition of one of the portion sum values across the threshold value for the portion concerned; and in response to the detected event, generating a digital signature characteristic of the sampled data segment.

8. The method as claimed in claim 7, wherein the signature generation comprises, on the basis of a predetermined signature collection pattern specifying a plurality of sample offsets from the detected event, determining whether the portion sum value at each sample offset is greater or less than the threshold value at the sample offset concerned, and set the value of a corresponding bit of a signature in dependence thereupon, to provide a binary signature.

9. The method as claimed in claim 7, wherein the signature generation comprises determining energy content across a frequency spectrum of a section of the sampled data segment, dividing the frequency spectrum into a plurality of frequency bands which are allocated respective identifying numbers, and determining the identifying number of the frequency band of maximum energy, to provide a frequency signature comprising this identifying number.

10. The method as claimed in claim 7, comprising band-pass filtering in a plurality of pass bands and generating respective envelope representations based on the data segment as filtered in each pass band.

11. The method as claimed claim 10, comprising detecting, as an event, for each envelope representation generated based on the data segment as filtered in each pass band, a transition of one of the portion sum values across the threshold value for the portion concerned.

12. The method as claimed in claim 7, wherein the sampled data segment is a sampled audio segment.

13. Computer equipment comprising computer programmed instructions stored thereon, which when executed by the computer equipment, carry out the method of claim 7.

14. A non-transitory computer readable storage medium storing a computer program that when executed by computer equipment, causes the computer equipment to carry out the method of claim 7.

15. The apparatus as claimed in claim 1, further comprising a database of digital signatures and means for comparing a further digital signature with digital signatures of the database, to seek a match between said further digital signature and a digital signature of the database.

* * * * *